United States Patent [19]

Suzuki et al.

[11] Patent Number: 4,576,639
[45] Date of Patent: * Mar. 18, 1986

[54] HYDROGEN STORAGE METAL MATERIAL

[75] Inventors: Ryoichi Suzuki; Jiro Ohno; Hisashi Gondo, all of Kawasaki, Japan

[73] Assignee: Nippon Steel Corporation, Tokyo, Japan

[*] Notice: The portion of the term of this patent subsequent to Dec. 18, 2001 has been disclaimed.

[21] Appl. No.: 613,343

[22] Filed: May 23, 1984

[30] Foreign Application Priority Data

May 26, 1983 [JP] Japan .................................. 58-93273

[51] Int. Cl.$^4$ ..................... C22C 30/00; C22C 38/00
[52] U.S. Cl. .............................. 75/123 E; 75/123 M; 420/581; 420/900

[58] Field of Search ............... 420/900, 417, 580, 581; D5/123 E, 123 G, 123 M

[56] References Cited

U.S. PATENT DOCUMENTS 4,079,523 3/1978 Sandroch .............................. 34/15

Primary Examiner—Christopher W. Brody
Attorney, Agent, or Firm—Wenderoth, Lind & Ponack

[57] ABSTRACT

Hydrogen storage metal material consisting of Ti-Fe-Mm which contains Mm in an atomic ratio in the range of from 0.015 to 0.1 with respect to Fe and optionally containing S in an atomic ratio in the range of from 0.004 to 0.04.

2 Claims, 4 Drawing Figures

HYDROGEN STORAGE METAL MATERIAL

BACKGROUND OF THE INVENTION

1. Field of the Invention

The present invention relates to a metal material consisting of Ti—Fe—Mischmetal for storing hydrogen at a high density in a stable manner.

2. Description of the Prior Art

Quite recently, a method of storing hydrogen in a metal or alloy in the form of metal hydride has been developed and this method has been applied to the storage, transportation, separation and purification of hydrogen. Ti—Fe has been developed as a typical metal alloy for use in this method of storing hydrogen. For instance, U.S. Pat. Nos. 3,508,414 and 3,516,263 disclose methods of storing hydrogen in a Ti—Fe alloy. In the hydrogen storage alloys disclosed in these patents, each has its own unique characteristics and differs from other alloys in, for example, activation, plateau property and hysteresis. Thus, various studies have been carried out with the aim of improving the characteristics of Ti—Fe alloys by the addition of other metal elements so as to provide alloys which are well adapted to other specific purposes.

The term "plateau" as used with respect to a hydrogen storage alloy in this specification refers generally to the horizontal flatness of an absorption or desorption isotherm obtained from the equilibrium hydrogen pressure-atomic ratio (H/M, H refers to the atomic weight of hydrogen and M to the atomic weight of metal element.) In case the plateau is not horizontally flat, at the time of hydrogen desorption, the hydrogen pressure is so gradually decreased that hydrogen hardly desorbs unless the desorption pressure tends to be low. Further, at the time of hydrogen absorption, with the increase in the amount of hydrogen storage, hydrogen is hardly absorbed unless the hydrogen pressure is much increased.

In the use of a hydrogen storage alloy having a plateau for storing hydrogen, it is difficult to maintain the hydrogen desorption pressure at a constant value. Further with a decrease of the desorption pressure, the amount of desorption decreases. In the use of the hydrogen storage alloy in an air conditioning system or in a heat engine of the waste heat recovery type, it is desirable that the pressure difference ($\Delta P$) between the equilibrium dissociation pressure of two different types of alloys and the equilibrium absorption pressure of the other alloy should be constant independently of the hydrogen content of the alloy (H/M). When the plateau property is horizontally flat, the hydrogen desorption and adsorption reactions of both alloys proceed smoothly since the pressure difference ($\Delta P$) is maintained constant.

In the Ti-Fe alloy, in order to activate the alloys to be reactive to hydrogen, it is required to periodically subject the alloy to elevated temperatures of higher than 400° C.-vacuum and to high pressure hydrogen treatment (30-60 Kg/cm$^2$) at room temperature for periods as long as one week.

Thus, where a Ti—Fe alloy is used for hydrogen storage or heat storage, since the alloy has to be subjected to high temperature and high pressure treatment, it follows that the container for the hydrogen storage alloy or the heat storage vessel must be made of a heat resistant and pressure resistant material. Therefore, it is necessary to use an expensive container or vessel and also to take various special precautions against the dangers of high temperature and high pressure in setting up the installation.

In addition, the necessity of carrying out repeated high temperature-high pressure treatments over an extended period of time is undesirable from the point of energy and labor costs in practical application. These drawbacks of hydrogen storage alloys have hampered their utilization in practical systems.

It has been found that this disadvantage can be overcome by replacing a part of the iron with Nb, Mn or Ti. However, although the addition of such an element improves the activation, use of Nb greatly increases the cost of the alloy while use of Mn or Ti disadvantageously results in variation of the hydrogen equilibrium dissociation pressure, thus causing the plateau property to become unsatisfactory. In addition, in the Ti—Mn alloy, in order to enhance the plateau property, the addition of other elements such as Zr, V, and Cr has been disclosed.

In general, when the alloy absorbs hydrogen, its volume expands by 10-30%. The repetitive absorption and desorption of hydrogen in the alloy is thus accompanied by repetitive expansion and contraction of the alloy with the result that the alloy is pulverized. Alloys such as FeTi-oxide, FeTiNb, FeTiMn, FeTiNbZr, etc. are known for their easy activation but they tend to be pulverized easily. The pulverized alloy will intermingle into the hydrogen gas desorbed from the alloy to cause the pipes and valves of the system to be clogged. Moreover, when it diffuses into the open air, it gives rise to environmental pollution.

U.S. Pat. No. 4,079,523 discloses that a low-oxygen Fe—Ti-Mischmetal alloy obtained by adding 0.05-1.5 weight % mischmetal (referred to as Mm hereinafter) to Fe—Ti alloy can be air-melted. According to the U.S. patent, comparison of this alloy with the conventional Fe—Ti alloy shows that while the conditions required for activation (450° C. and a hydrogen pressure of 68 atmospheres) are the same as those for the conventional Fe—Ti alloy, the time required for activation is 38 hours as against 111 hours for the conventional alloy.

Thus, it has been known to improve the characteristics of the alloy by the addition of metal elements. However, from the practical aspects of production cost, plateau property, hydrogen storage capacity, service life etc., there still remain various problems to be solved.

SUMMARY OF THE INVENTION

It is a prime object of the present invention to provide a novel hydrogen storage metal material which is capable of storing a large amount of hydrogen in a stable manner at about room temperature.

It is another object of the invention to provide a low cost hydrogen storage metal material which is easy to activate and which exhibits an excellent plateau property with respect to the equilibrium pressure of hydrogen dissociation.

These and further objects of the invention will become apparent from the following description with reference to the drawings.

DETAILED DESCRIPTION OF THE INVENTION

The inventors conducted extensive studies on hydrogen storage metal materials with the aim of eliminating the defects of the Ti—Fe hydrogen storage metals and promoting their practical use. In consequence, they have found that the defects of the Ti—Fe alloys of the prior art are overcome by a novel hydrogen storage metal material wherein the amount of Ti contained is in the range of 0.90–1.05 in terms of atomic ratio to Fe and the amount of Mm contained is in the range of 0.015–0.1 in terms of atomic ratio to Fe, and that this alloy exhibits excellent properties as a hydrogen storage material.

The ternary Ti—Fe—Mm alloy of the present invention can be easily activated in a short time at room temperature and is excellent in respect of hydrogen storage, amount of hydrogen release, plateau property and low cost. Thus, the alloy has outstanding characteristics as a metal material for hydrogen storage uses.

The method of preparing the Ti—Fe—Mm alloy disclosed in U.S. Pat. No. 4,079,523 is an air-melting process consisting of deoxidizing molten Ti-Fe alloy contained in a crucible by addition of Mm and then separating the deoxidized molten alloy from the oxide-containing Mm slag, thus obtaining a low-oxygen alloy. The Mm content remaining in the alloy by this process amounts to 0.05–1.5 weight %.

In contrast to this, the present invention provides an alloy which exhibits greatly improved activation performance and can be easily activated at room temperature by causing the alloy to contain Mm at an atomic ratio to Fe of 0.015–0.1, which amounts to a high concentration of Mm in the alloy of about 2–12 weight %.

In general, the Mm used in the present invention is a mixture of cerium group metals of the rare earth elements containing one or more elements among those with atomic numbers 57–71 in the periodic table. In particular, Mm containing a great amount of Ce gives better results in terms of the characteristics obtained.

Figure 1:
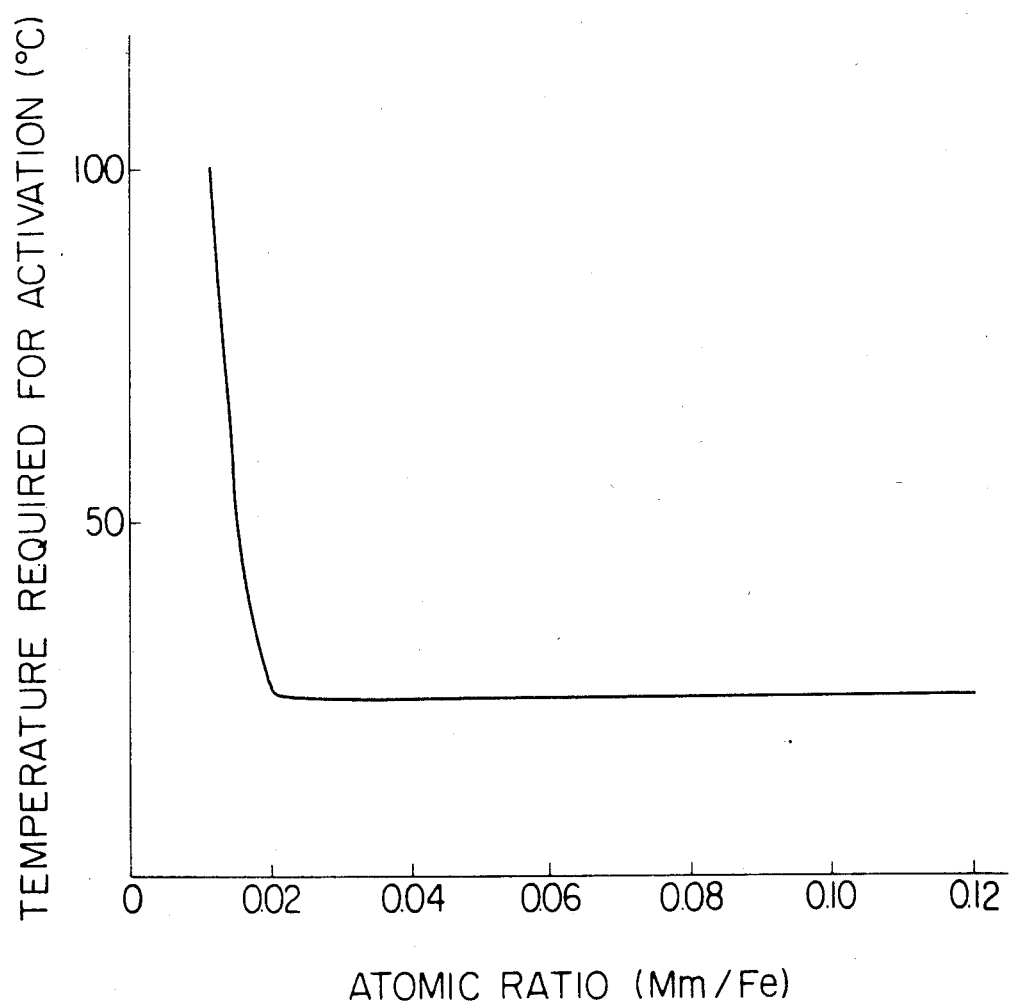
FIG. 1 is a diagram showing how the temperature required for activation of an Fe—Ti—Mm alloy within ten hours under a hydrogen pressure of 30 kg/cm$^2$ varies with Mm content (atomic ratio of Mm/Fe)

FIG. 1 shows the relation between the content of Mm of the Ti—Fe alloy and the activation characteristics thereof, where the temperature required for activation within ten hours under the hydrogen pressure 30 kg/cm$^2$ is indicated on the ordinate while the atomic ratio of Mm/Fe is indicated on the abscissa.

It is seen that when Mm/Fe is more than 0.02, activation is possible at room temperature, while the required activation temperature is 50° C. when Mm/Fe is 0.015 and 100° C. when Mm/Fe is 0.012. As in practical application, it is preferable to carry out activation near room temperature, and the atomic ratio of Mm/Fe is therefore preferably 0.015 or more. On the other hand, the viscosity of the molten alloy increases as Mm/Fe increases, and the upper limit of the atomic ratio is therefore preferably about 0.1 from the viewpoint of ease of operation.

Figure 2:
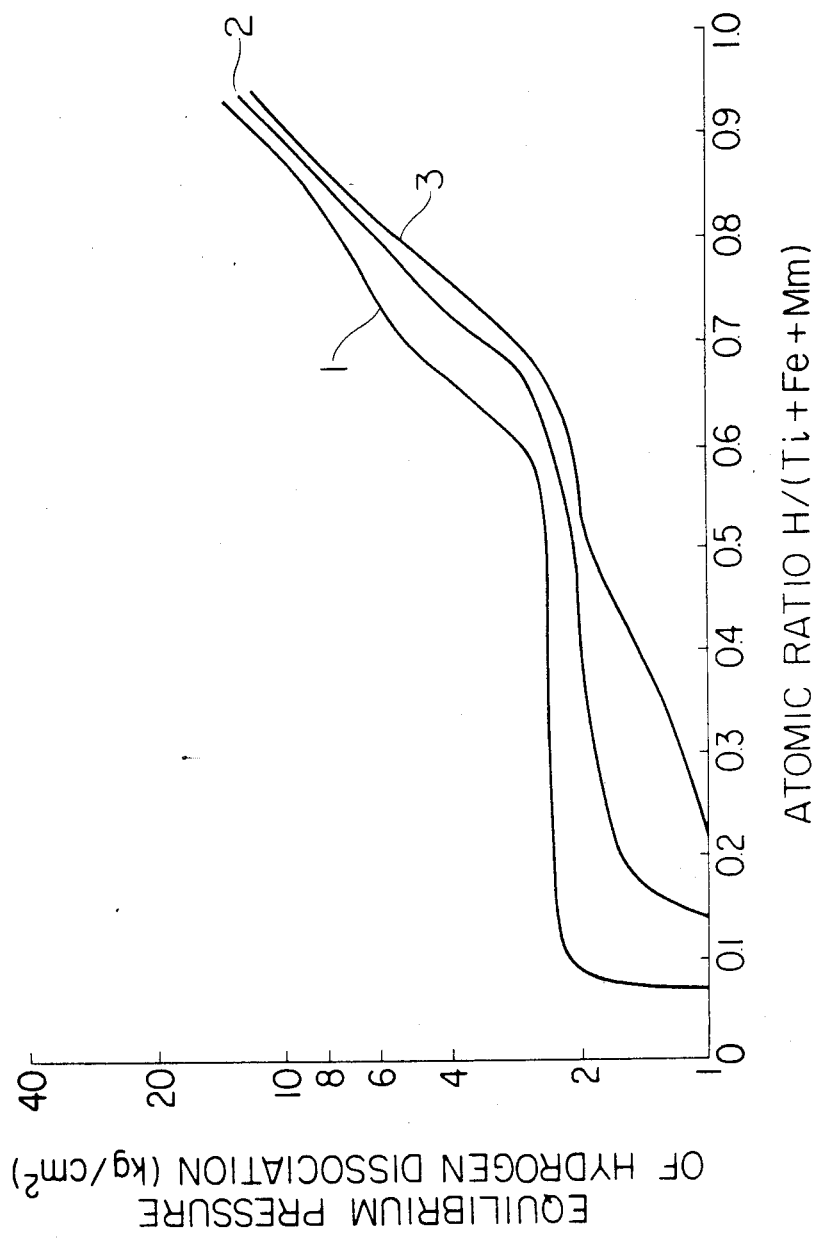
FIG. 2 is a diagram showing the hydrogen release curves at 25° C. for Fe—Ti—Mm alloys containing Mm at an atomic ratio of Mm/Fe of 0.05 but containing different amounts of Ti.

The atomic ratio of Ti/Fe greatly affects the plateau property of the alloy. As indicated by curve (1) in the case of Fe—Ti$_{1.0}$—Mm$_{0.05}$ in FIG. 2, when the ratio of Ti/Fe is 1.0, the plateau is very good. On the other hand, curve (2) for Fe—Ti$_{1.05}$—Mm$_{0.05}$, a ratio of 1.05, has a somewhat inferior plateau, and curve (3) for Fe—Ti$_{1.1}$—Mm$_{0.05}$, a ratio of 1.10, has an even worse plateau. The plateau property is defined by the following parameter:

$$\frac{\text{(Dissociation pressure at H/M} = 0.25)}{\text{(Dissociation pressure at H/M} = 0.5)}$$

The plateau property of Fe—Ti$_{1.0}$—Mm$_{0.05}$ is 1.0; that for Fe—Ti$_{1.05}$—Mm$_{0.05}$ is 0.79; and that for Fe—Ti$_{1.1}$—Mm$_{0.05}$ is 0.57. Although the effect which the ratio of Ti/Fe has on the plateau property varies somewhat with the Mm content, it was determined through various experiments that Ti/Fe should preferably be less than 1.05. Moreover, it was found that if Ti/Fe is lower than 0.9, the plateau becomes narrower. Therefore, Ti/Fe should be in the range of 0.9–1.05.

The inventors further found that when sulphur is mixed with the Fe—Ti—Mm ternary alloy at an atomic ratio of 0.004–0.04 with respect to the combined content of Ti and Mm, the thus formed sulphides of Mm and Ti contribute to the improvement of the activation characteristics and the plateau property with respect to the equilibrium pressure of hydrogen dissociation, so that the amount of hydrogen storage and release in the vicinity of room temperature can be considerably increased.

The Fe-Ti-Mm ternary alloy defined in this specification is one containing Ti at an atomic ratio to Fe in the range of 0.90–1.05 and containing Mm at an atomic ratio to Fe in the range of 0.015–0.1.

Figure 3:
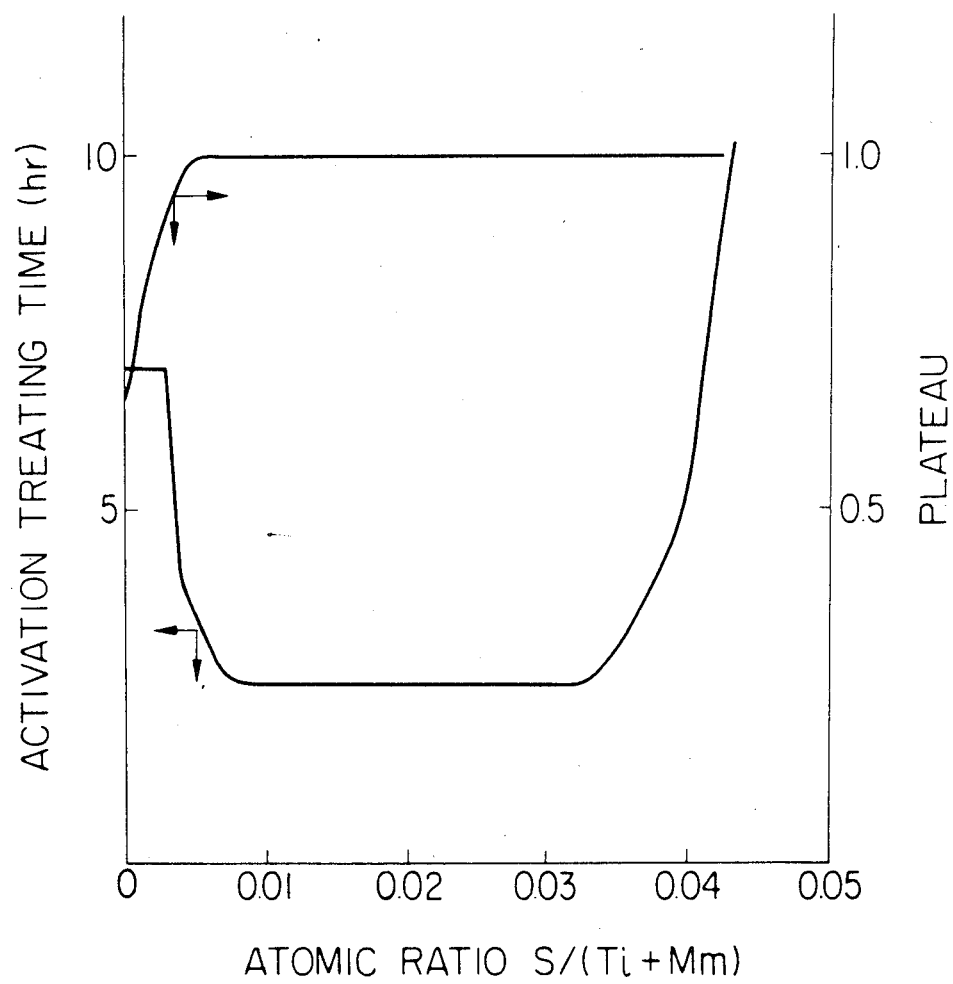
FIG. 3 is a diagram showing how the activation time and plateau property of Fe—Ti$_{1.01}$—Mm$_{0.1}$ alloy varies with S content.

FIG. 3 shows the relation between S content, the treatment time required for activation at room temperature, and the plateau property of an Fe—Ti$_{1.01}$—Mm$_{0.1}$ alloy, in which it is seen that a distinct improvement in performance is obtained when S is contained at an atomic ratio of 0.004 or more with respect to the combined amount of Ti and Mm. If the S content exceeds 0.04, however, the activation performance deteriorates. Although the effect of S content depends somewhat on the composition of the Fe—Ti—Mm alloy, it was found through various experiments that the preferred range of S content is 0.004–0.04 as an atomic ratio with respect to the combined amount of Mm and Ti. Furthermore, in addition to the above, it was found that S is effective in reducing the viscosity and kinematic viscosity of the molten alloy so that its addition facilitates the manufacture of an alloy with good homogeneity.

The present invention will now be explained through the following examples.

EXAMPLE 1

Mixtures of commercially available electrolytic iron powder, approximately 99% pure sponge titanium in an amount equal to an atomic ratio of 0.90–1.05 with respect to the electrolytic iron, and 98% pure Mm (containing about 50 weight % Ce as its chief component, about 30 weight % La and about 15 weight % Nd) in an amount equal to an atomic ratio of 0.015–0.1 with respect to the electrolytic iron was placed in a water-cooled copper crucible and melted in an argon arc melting furnace to produce a Ti—Fe—Mm alloy. The thus obtained ingot was pulverized in air to a powder of 80 mesh or less to obtain a sample.

Table 1 shows the compositions of the Ti—Fe—Mm alloys produced by the arc melting process, the times required for activation under a hydrogen pressure of 30 kg/cm² at room temperature, amounts of hydrogen storage under a hydrogen pressure of not more than 10 kg/cm² and plateau as defined by the parameter described hereinbefore

TABLE 1

| Sample | Alloy Composition | Time required for activation (hour) | Amount of Hydrogen Storage (ml/g) | Plateau |
|---|---|---|---|---|
| A | FeTi$_{1.02}$Mm$_{0.02}$ | 4 | 175 | 0.93 |
| B | FeTi$_{1.05}$Mm$_{0.02}$ | 3 | 180 | 0.75 |
| C | FeTi$_{1.0}$Mm$_{0.05}$ | 7 | 181 | 1.0 |
| D | FeTi$_{0.95}$Mm$_{0.1}$ | 5 | 178 | 0.95 |
| E | FeTi$_{0.90}$Mm$_{0.1}$ | 3 | 175 | 0.98 |
| F | FeTi$_{1.0}$Mm$_{0.1}$ | 5 | 179 | 0.90 |

EXAMPLE 2

The same electrolytic iron powder as in Example 1, the same sponge titanium as in Example 1 in an amount equal to an atomic ratio of 0.9-1.05 with respect to the electrolytic iron, the same Mm as in Example 1 in an amount equal to an atomic ratio of 0.015-0.1 with respect to the electrolytic iron, and sulphur in an amount equal to an atomic ratio of 0.01-0.02 with respect to the combined amount of Mm and Ti was placed in a water-cooled copper crucible and melted in an argon arc melting furnace to produce a Ti—Fe—Mm—S alloy. The thus obtained ingot was pulverized in the air to a powder of 80 mesh or less to obtain a sample.

Table 2 shows the compositions of the Ti—Fe—Mm—s alloys produced by the arc melting process, the times required for activation under a hydrogen pressure of 30 kg/cm² at room temperature, the amounts of hydrogen storage under a pressure of not more than 10 kg/cm² and the plateau as defined hereinbefore.

TABLE 2

| Sample | Alloy Composition | Time required for activation (hour) | Amount of Hydrogen Storage (ml/g) | Plateau |
|---|---|---|---|---|
| G | FeTi$_{0.95}$Mm$_{0.1}$S$_{0.02}$ | 2.5 | 183 | 1.0 |
| H | FeTi$_{1.0}$Mm$_{0.05}$S$_{0.01}$ | 5 | 181 | 1.0 |
| I | FeTi$_{1.0}$Mm$_{0.1}$S$_{0.02}$ | 3 | 178 | 0.97 |

EXAMPLE 3

The same electrolytic iron powder as in Example 1, the same sponge titanium as in Example 1 in an amount equal to an atomic ratio of 0.9-1.05 with respect to the electrolytic iron, and 99% pure Ce in an amount equal to an atomic ratio of 0.015-0.1 with respect to the electrolytic iron were placed in a water-cooled copper crucible and melted in an argon arc melting furnace to prepare a Ti—Fe—Ce alloy. The thus prepared ingot was pulverized in the air to a powder of 80 mesh or less to obtain a sample.

Table 3 shows the compositions of the Ti—Fe—Ce alloys produced in the arc melting furnace, the times required for activation under a hydrogen pressure 30 kg/cm² at room temperature, the amounts of hydrogen storage under a hydrogen pressure of not more than 10 kg/cm² and the plateau as defined hereinbefore.

TABLE 3

| Sample | Alloy Composition | Time required for activation (hour) | Amount of Hydrogen Storage (ml/g) | Plateau |
|---|---|---|---|---|
| J | FeTi$_{1.02}$Ce$_{0.05}$ | 4 | 183 | 0.78 |
| K | FeTi$_{1.0}$Ce$_{0.05}$ | 5 | 180 | 0.94 |
| L | FeTi$_{0.95}$Ce$_{0.1}$ | 2.5 | 181 | 0.95 |
| M | FeTi$_{0.9}$Ce$_{0.1}$ | 3 | 179 | 0.98 |
| N | FeTi$_{0.95}$Ce$_{0.02}$ | 5 | 180 | 0.97 |
| O | FeTi$_{0.90}$Ce$_{0.02}$ | 7 | 178 | 0.98 |

Figure 4:
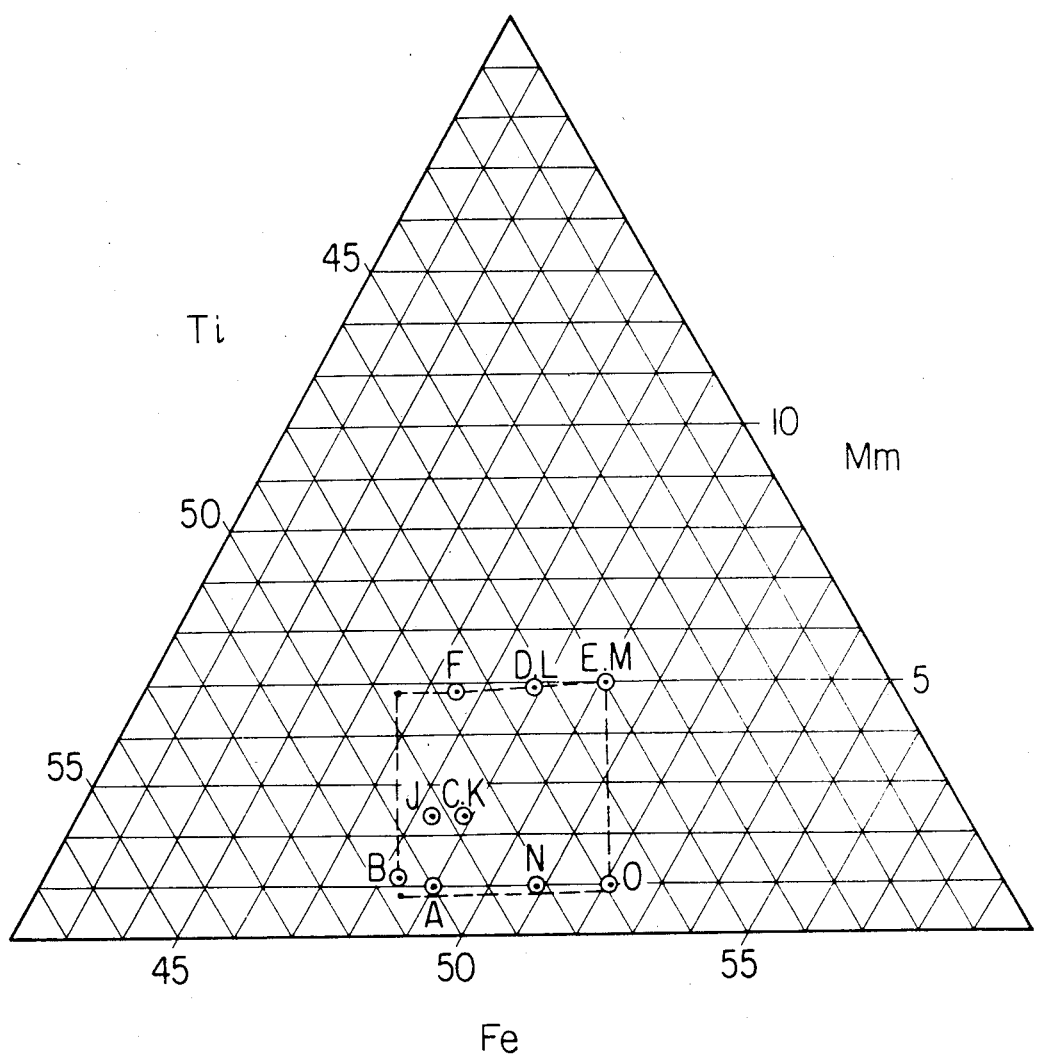
FIG. 4 is a three-component diagram for Fe—Ti—Mm alloy with the components expressed in atomic percentages.

The range of the Fe—Ti—Mm alloys in accordance with the present invention lies within the broken line in FIG. 4 which indicates the ternary component system in atomic percentages (%). In FIG. 4, the marks ⊙ indicate the alloys described in the examples.

As clearly shown in Tables 1, 2 and 3, the alloys of the invention are rapidly activated within 2.5-7 hours at room temperature and are excellent in respect to amount of hydrogen storage and plateau.

As an endurance test, the Fe—Ti—Mm and Fe—Ti—Mm—S alloys of the invention were subjected to repeated hydrogen absorption and desorption cycles with the result that almost no deterioration was obtained in the characteristics of the alloys even after 10,000 cycles. The particle size of the hydrogen storage alloys of the invention which had been subjected to 10,000 absorption/desorption cycles was 40-50 μmφ on the average. Thus the degree of pulverization was so small that filtering to prevent the powder from scattering during use could be carried out easily.

As fully described in the foregoing, the Ti—Fe—Mm and Ti—Fe—Mm—S alloys of the present invention are excellent in activation characteristics, plateau, hydrogen storage capacity and durability, and they can be produced from low-cost materials. Thus, in the aspects of practicality and economy, the alloys of the invention provide outstanding effects and advantages.

We claim:

1. A hydrogen storage metal material, namely Ti—Fe—Mm, consisting essentially of Ti in an atomic ratio in the range of from 0.90 to 1.05 with respect to Fe, Mm in an atomic ratio in the range of from 0.015 to 0.1 with respect to Fe, and the remainder Fe.

2. A hydrogen storage metal material, namely Ti—Fe—Mm—S, consisting essentially of Ti in an atomic ratio in the range of from 0.90 to 1.05 with respect to Fe, Mm in an atomic ratio in the range of from 0.015 to 0.1 with respect to Fe, S in an atomic ratio in the range of from 0.004 to 0.04 with respect to the combined amount of Ti and Mm, and the remainder Fe.

* * * * *